(12) United States Patent
Costa

(10) Patent No.: US 6,827,253 B2
(45) Date of Patent: Dec. 7, 2004

(54) METHOD AND MEANS FOR RAPID HEAT-SINK SOLDERING

(76) Inventor: Larry J. Costa, 55613 Currant Rd., Mishawaka, IN (US) 46545

( * ) Notice: Subject to any disclaimer, the term of this patent is extended or adjusted under 35 U.S.C. 154(b) by 36 days.

(21) Appl. No.: 10/329,654

(22) Filed: Dec. 24, 2002

(65) Prior Publication Data

US 2003/0089761 A1 May 15, 2003

Related U.S. Application Data

(63) Continuation-in-part of application No. 09/850,398, filed on May 7, 2001, now Pat. No. 6,550,668.

(51) Int. Cl.7 .............................. B23K 37/04; B23K 5/00
(52) U.S. Cl. ........................ 228/212; 228/44.7; 228/46; 228/219; 228/222
(58) Field of Search ................................ 228/200, 212, 228/213, 219, 222, 254, 42, 44.7, 46, 49.1, 49.5

(56) References Cited

U.S. PATENT DOCUMENTS

| 3,640,519 A | 2/1972 | Halstead ..................... 269/254 |
|---|---|---|
| 3,830,681 A | 8/1974 | Wilson ........................ 156/583 |
| 3,845,606 A | 11/1974 | Wilson ...................... 53/21 FC |
| 3,874,443 A | 4/1975 | Bayer ........................... 165/47 |
| 4,135,573 A | 1/1979 | Sutter ........................... 165/80 |
| 4,632,294 A | 12/1986 | Druschel et al. ............ 228/119 |
| 4,889,277 A | 12/1989 | Zahn ........................ 228/180.2 |
| 4,962,878 A | 10/1990 | Kent ............................ 228/47 |
| 6,550,668 B2 * | 4/2003 | Costa .......................... 228/212 |
| 2002/0162878 A1 | 11/2002 | Costa |
| 2003/0089761 A1 * | 5/2003 | Costa ......................... 228/245 |

\* cited by examiner

Primary Examiner—Kiley S. Stoner
(74) Attorney, Agent, or Firm—Thomte, Mazour & Niebergall; Shane M. Niebergall

(57) ABSTRACT

A method and system for rapid heat-sink soldering, having a workpiece gripper, an intense heat source, and an optional air-jet cooling system, is provided for soldering workpieces to substrates of dissimilar material composition. The workpiece gripper selectively positions the workpiece closely adjacent the substrate and continually removes excess heat from the workpiece, both during and after the application of heat to the workpiece. Upon termination of the heat application, air-jet cooling can be provided to the workpiece to quickly cool the terminal and the molten layer of solderable material.

20 Claims, 4 Drawing Sheets

METHOD AND MEANS FOR RAPID HEAT-SINK SOLDERING

CROSS-REFERENCE TO RELATED APPLICATION

This is a continuation-in-part application of Petitioner's earlier application Ser. No. 09/850,398 filed May 7, 2001, now U.S. Pat. No. 6,550,668, entitled METHOD AND MEANS FOR RAPID HEAT-SINK SOLDERING.

BACKGROUND OF THE INVENTION

1. Field of the Invention

This invention relates to soldering methods and more particularly to a method of effectively soldering components together that have different compositions.

2. Description of the Prior Art

Soldering components that have different compositions presents certain technical challenges. One example of this is the soldering of workpieces made from metal, such as copper, brass, or plated steels, onto glass or ceramic substrates, which may or may not be coated or laminated with a plastic material. Two concerns that arise when soldering different materials together include the different rates of expansion of the materials and the damage that may occur to the substrate, such as the re-crystallization of a silica-based substrate.

Prior art soldering technology requires that the substrate be relatively cool for the heated terminal's solder interface to solidify. This causes the cooled solder joint to contract and pre-stress the soldered interface, thereby reducing the mechanical strength of the connection. One specific example involves the soldering of copper electrical terminals to the silver oxide painted defrost grid of an automobile's rear window, as shown in FIG. 1. The rate of expansion for the glass, is approximately 0.000004 inches per degree Fahrenheit, compared to 0.000009 inches per degree Fahrenheit for copper. This becomes a problem when the components are heated and cooled for the solder interface to bond the components together. During heating, the copper terminal will expand more than the glass. During cooling, the solder joint will solidify while the terminal contracts a greater amount than the glass. This causes the fully cooled terminal to exert stress on the solder interface and the glass, reducing the mechanical strength of the connection. This problem is evident in several other applications, including the soldering of electrical connection pins to dense silica monolithic circuit chips.

Prior art soldering methods tend to generate an excessive amount of heat when the heat for soldering is applied. Oftentimes, such soldering methods will generate sufficient heat to damage the substrate. One example of the damage that can be caused is the annealing of tempered safety glass. Safety glass is tempered by first heating it to a critical temperature, then rapidly cooling it below a specific temperature. During the soldering process, the copper terminal is heated to cause the solder to flow, allowing the terminal's heat to be transferred to the adjacent glass. This becomes a problem when the terminal's solder temperature reaches or surpasses the annealing temperature of the glass. During cooling, the solder joint will solidify and the glass adjacent to the terminal becomes annealed. This annealed section of the glass will no longer be safety tempered and will no longer break into the small fragments required by Federal Regulations.

Other types of damage to the substrate may include the melting or disfiguring of plastic materials and laminates. Such materials are also susceptible to discoloration or, in the case of a transparent substrate, rendering the substrate opaque. Unfortunately, those of skill in the art are well accustomed to these and other types of damage that occur to substrates during a soldering operation.

The damage that can occur during a soldering operation is not limited only to the substrate. There may be instances where the heat generated by the soldering operation is transferred to an adjacent component coupled to the substrate. There may also be instances where a workpiece is provided with a circuit or other such sensitive component coupled thereto. Excessive heat transfer during a soldering operation frequently results in the damage of such components, which may not become apparent until it is too late.

Therefore, there is a need for an improved method and system for soldering components together that are composed of different materials.

SUMMARY OF THE INVENTION

A method and system for rapidly soldering a workpiece to a substrate, having a different material composition than the workpiece, is disclosed herein. The system comprises an intense heat source, such as an intermittent micro flame, a workpiece gripper, having gripping jaws that are comprised of a heat-conductive material, and an optional air-jet cooler.

The workpiece is first secured between the jaws of the gripper, which are further adapted to selectively position the workpiece closely adjacent a point of use on the substrate. Intense heat is applied to the workpiece, in this instance being coated with a solderable material, causing the solderable material to melt. The jaws are sufficient in thermal conductivity to serve as a heat sink, preventing the temperature of the workpiece to significantly increase beyond the melting point of the solderable material during heating. This minimizes the transmission of heat from the workpiece and layer of molten solderable material to the substrate. After the solder has melted, the intense heat source is shut off and an optional jet of cool air is directed to the workpiece. While the jet of air is cooling the workpiece and layer of solderable material, the gripping jaws continue to remove residual heat from the workpiece. These methods of cooling cause the solder joint to rapidly solidify.

Using this method and system, the time required to first melt the layer of solderable material and then solidify the solder connection is short enough that the effect of the different rates of expansion between the workpiece and the substrate is greatly minimized. This is of great importance when the workpiece-receiving substrate is made of glass, such as tempered safety glass or other material that is easily damaged during the soldering phase. The rapid heating and cooling time aid in preventing damage to the substrate and further allows for a stronger solder joint.

Therefore, a principal object of the invention is to provide an improved system for rapid heat sink soldering.

A further another object of the present invention is to provide a system for rapid heat sink soldering that reduces the heat transfer from a heated workpiece to a substrate.

Still another object of the invention is to provide a system for rapid heat sink soldering that reduces the time required for solidifying the layer of molten solderable material.

Yet another object of the invention is to provide a system for rapid heat sink soldering that will not damage the substrate to which a workpiece is soldered.

A further object of the present invention is to provide a system for rapid heat-sink soldering that will not damage components coupled to a workpiece when the system is used to solder the workpiece to a substrate.

Still another object of the invention is to provide a system for rapid heat sink soldering that minimizes the effect of the difference in the rate of expansion between a workpiece and a substrate of different compositions when the two structures are soldered together.

These and other objects will be apparent to those skilled in the art.

DESCRIPTION OF THE PREFERRED EMBODIMENT

Figure 1:
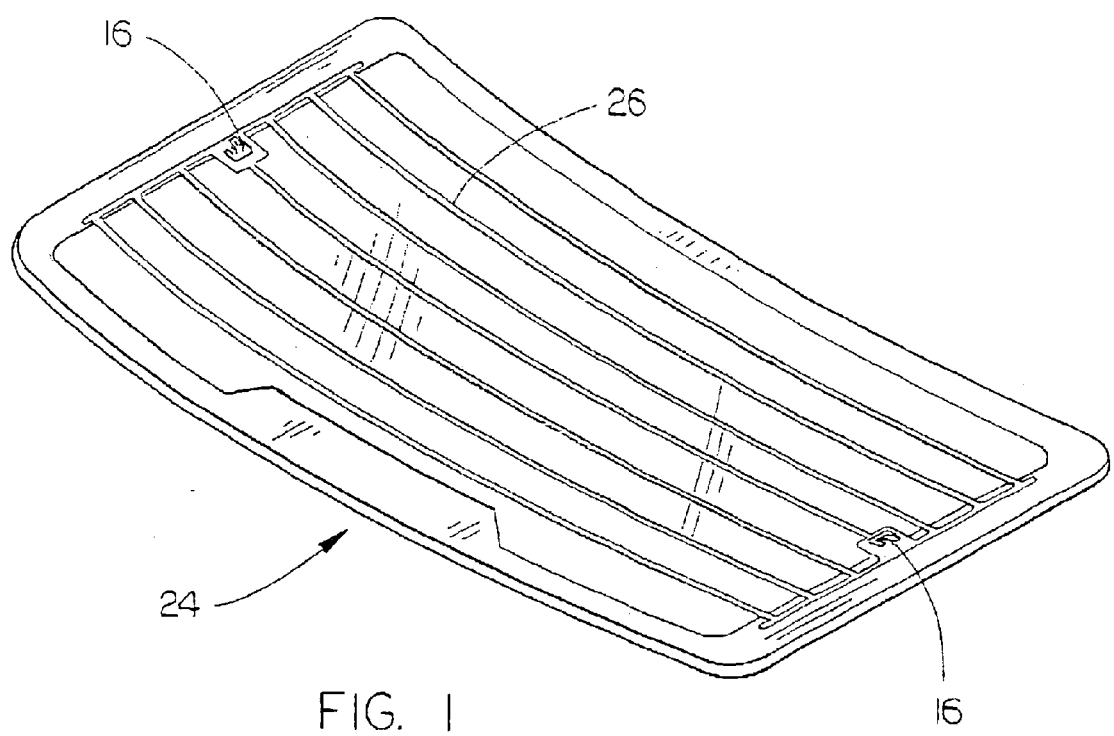
FIG. 1 is a perspective view of an automobile window.
Figure 2:
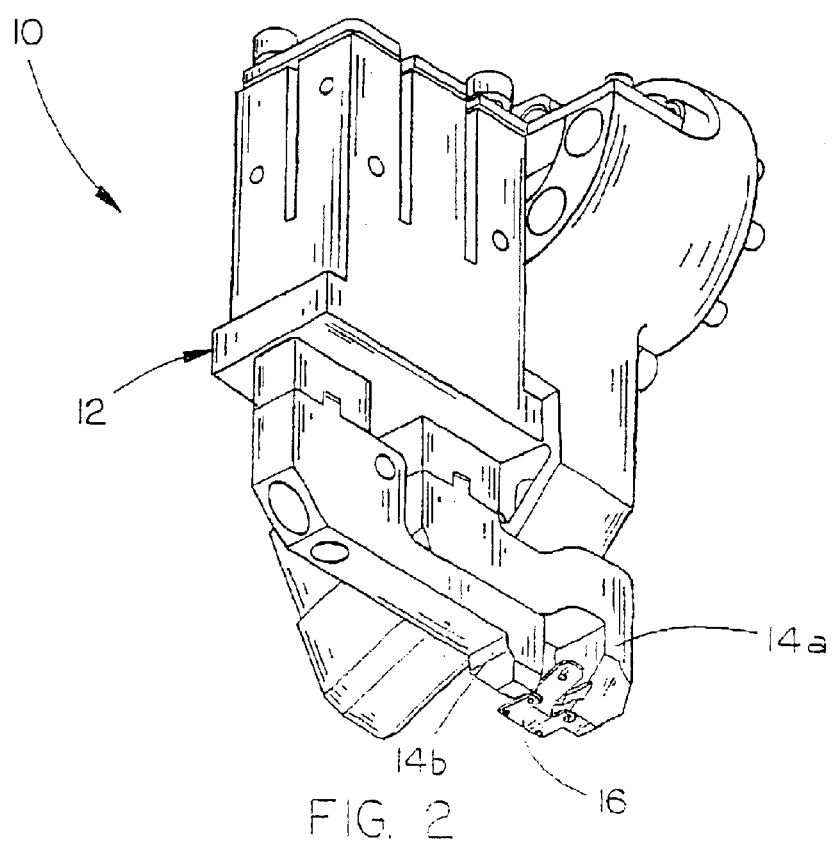
FIG. 2 is a perspective view of the lower right side of the soldering system of the present invention.
Figure 3:
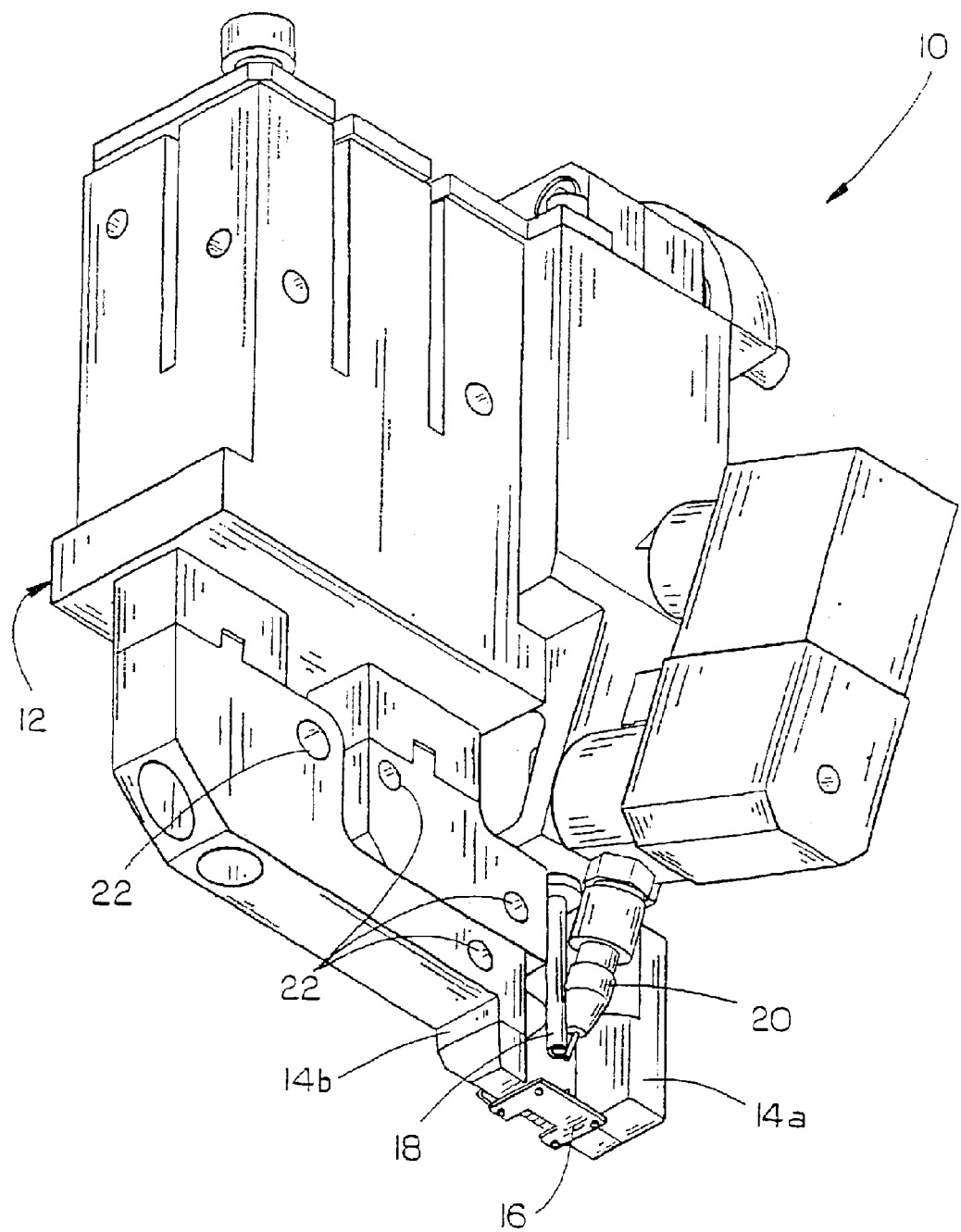
FIG. 3 is a perspective view of the lower left side of the soldering system of the present invention.
Figure 4:
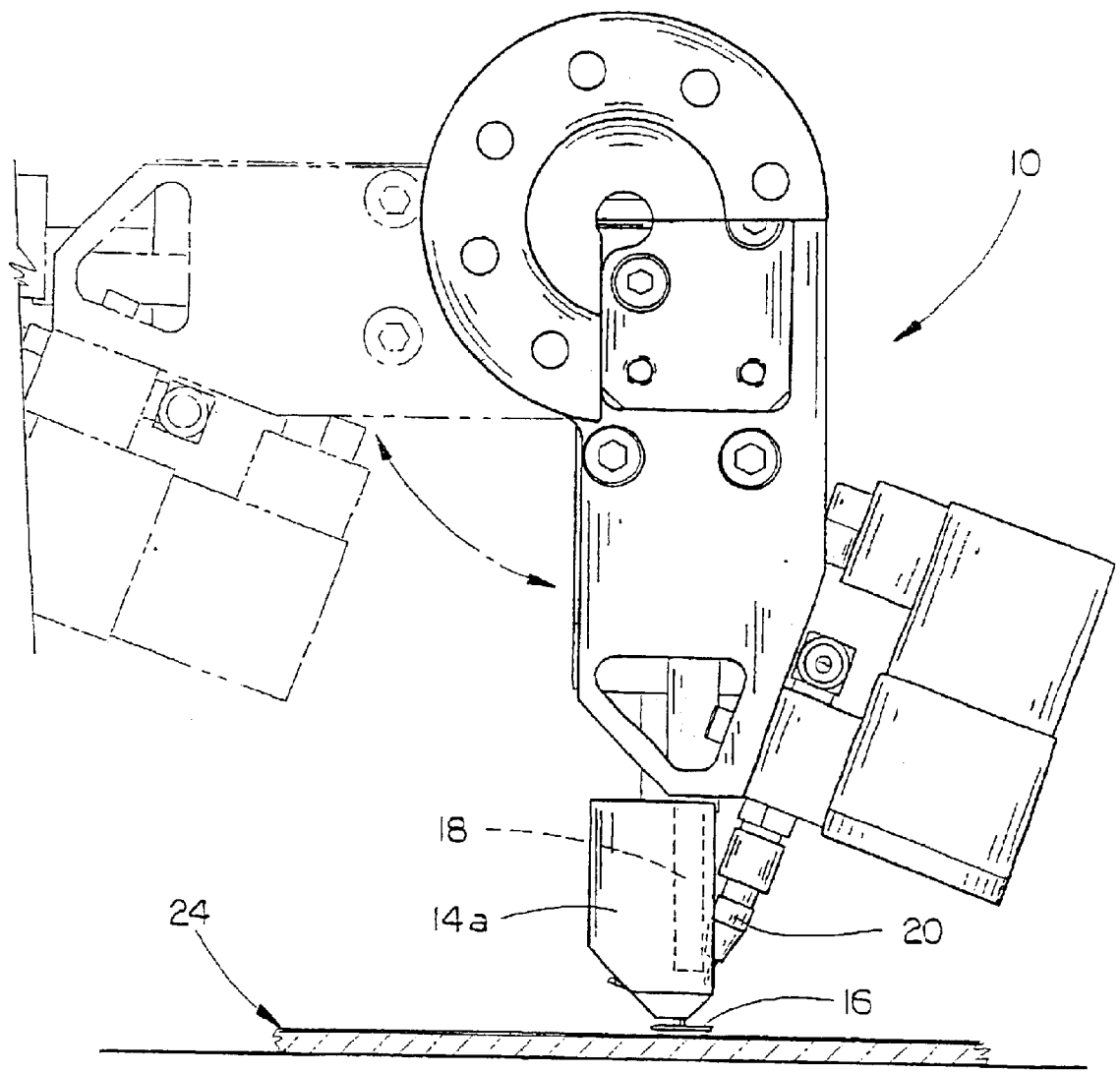
FIG. 4 is a side elevation view of the soldering system of the present invention, showing the soldering arm in an extended working position.

The numeral 10 refers generally to the rapid heat-sink soldering system of this invention. As shown in FIGS. 2–4, the system 10 generally includes a gripper 12, a pair of generally parallel jaws 14a and 14b, an ignition source 18, and an intense heat source 20. Although the foregoing elements could be incorporated into manually operated and automated devices, the following embodiment will be described as an automated device. Moreover, it is contemplated that the specific arrangement and type of elements described herein could be modified to implement the methods of soldering discussed herein. It is contemplated that the system 10 will typically be used to solder workpieces to substrates of various compositions; however, other applications will be apparent to those of skill in the art. The type of substrates which could be used with the present invention are virtually limitless, including plastics, ceramic, glass, and those that combine materials, such as plastic laminated glass. However, for ease of description, the substrate herein will be described as a glass plate, as such may be used in the rear window of an automobile.

The air-actuated gripper 12 of the present embodiment is adapted to move the opposing jaws 14a and 14b toward or away from each other. The jaws 14a and 14b are adapted to grab, hold, and release a terminal 16 or other desired workpiece. Although the present embodiment uses a pair of jaws 14a and 14b, it is contemplated that the number of jaws used in a particular embodiment will be dictated by the geometric shape of the chosen workpiece. For example, three or more jaws may be preferred when the workpiece has a round geometry, such as a snap terminal. While the workpiece gripper 12 is preferably adapted to secure the terminal 16 between the jaws 14a and 14b with an inward pressure, it is contemplated that the shape of the terminal may permit other methods and positions for securing the terminal. For example, a terminal having an open central portion may be secured by the jaws 14a and 14b adjacent the open central portion with outwardly directed pressure. Moreover, the gripper 12 could be positioned so that a lower surface of the jaws 14a and 14b engage the planar base of the terminal 16 to provide for additional heat-sinking capabilities, which will be discussed hereinbelow.

The soldering mechanism of the present embodiment is comprised of an intermittent micro flame soldering tool 20, although it is contemplated that virtually any number of intense heat sources, such as electrical resistance, laser, friction, ultrasonic, induction, etc., could be employed in the device. Adjacent the soldering tool 20 is disposed an elongated, hollow structure 18 which is comprised of an electrically conductive material such as stainless steel, copper, nickel, or gold. In this configuration the structure serves as both the ignition source for soldering tool 20 and as a conduit for air-jet cooling (discussed herein below). The ignition role of structure 18 is performed through the transmission of an electric current through structure 18. Although any number of sources could be used, the present embodiment uses 8-mm high-tension insulated wire, which originates above structure 18 in the gripper 12, to produce the required electrical current. The electric current reaches the terminal end of structure 18 and ignites the fuel utilized by the intermittent micro flame 20.

Preferably, terminal 16, or any other type of workpiece used, comprises an integrated solder layer disposed on the surface of terminal 16 that is to be connected to a point of use on the glass plate 24. The terminal 16 may also have a flux coating applied thereto. It is contemplated, however, that the soldering system 10 may also be comprised of a conventional apparatus for applying soldering related materials, such as a flux coating apparatus, solder paste application, or solder-wire feeder apparatus. In either case, however, the apparatus would apply the soldering materials to the terminal 16 immediately prior to the implementation of terminal 16.

In operation, the parallel jaws 14a and 14b are drawn toward each other by the gripper 12 to grasp an individual terminal 16. The gripper 12 is positioned such that the parallel jaws 14a and 14b hold the terminal 16 at its point of use, as shown in FIG. 4. The soldering tool is then operated such that it heats terminal 16 to a temperature which is sufficient to melt the solder disposed on the underside of terminal 16, thereby adhering terminal 16 to the silver oxide structure 26 located on glass plate 24. The intermittent micro flame 20 is then extinguished. Due to the intense heat source (approximately 5,400 degrees Fahrenheit) the total solder cycle is accomplished in approximately 2.0 seconds. The final solder "wetting" phase of the solder cycle is accomplished in approximately 0.2 seconds, which is typically an insufficient time to transfer heat from the terminal 16 to the glass plate 24 such that the glass plate 24 (or other such substrate) would be damaged.

Rapid cooling of the solder layer 28 is attained through the use of heat-sinking. The jaws 14a and 14b that support terminal 16 further serve as heat sinks for the present soldering device 10. Jaws 14a and 14b are preferably comprised of a conductive material such as stainless steel, copper, nickel, or gold. It is further preferred that the conductive material be non-corrosive, to prevent deterioration and or loss of thermal conductivity. When intense heat is applied to the terminal 16 to melt the solder, the excess heat is transmitted through jaws 14a and 14b, away from the glass plate 24. Accordingly, regardless of the particular application and source of heat, a sufficient mass of conductive material should be provided within jaws 14a and 14b to achieve the level of heat-sinking desired.

Air-jet cooling can also be provided to assist in the rapid cooling of the solder layer 28. Once the intense heat source is removed from terminal 16, a solenoid valve that is coupled to gripper 12 is actuated to force cool air into the system and through hollow structure 18, thereby providing a jet of cool air directly onto terminal 16. Alternative embodiments of the air-jet cooling method employ a compressed inert gas, such as nitrogen or carbon dioxide, or shielding gas, such as helium, that is directed to the terminal through hollow structure 18. The use of an inert or shielding gas to cool the terminal, layer of solder, and the structure, provides the added benefit of minimizing the oxidation of the component parts as they cool.

Figure 5:
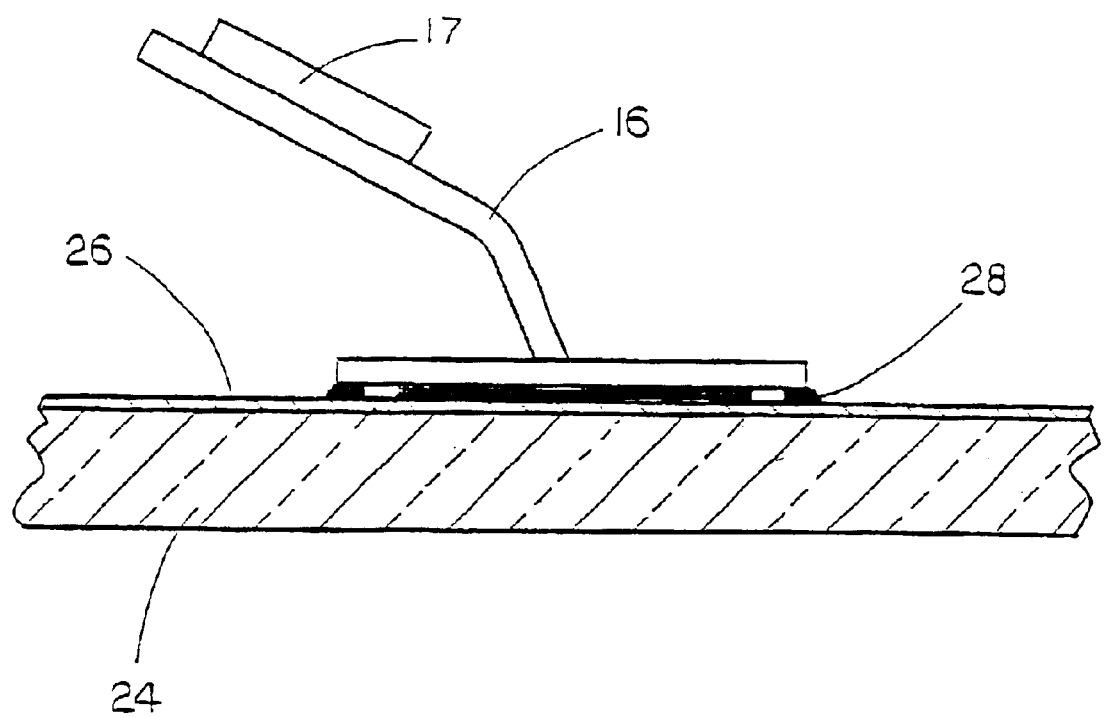
FIG. 5 is an enlarged view of a workpiece that has been soldered to a substrate.

Additional heat sinking could be accomplished by cooling jaws 14a and 14b with a system of internal cooling 22, which uses non-combustible gas or liquid that is channeled throughout the system, or external cooling source (not shown) that directs non-combustible gas or liquid to the external surface of the system. Regardless of the heat-sinking method used, it is important that the post-solder cooling be accomplished by the heat sinks and/or the air-jet cooling system, rather than the transfer of heat through the glass plate 24. These methods not only help to prevent the damaging of the substrate, but further allow for rapid cooling to occur once the intense heat source is removed from terminal 16.

Where the terminal 16 is provided with a circuit, processor, or other such component 17 coupled thereto, as shown in FIG. 5, it is preferred that the methods of heat-sinking and cooling be employed to prevent the transfer of excessive heat from the terminal 16 to the component 17, reducing the likelihood of damage thereto. Accordingly, the jaws 14a and 14b will grasp the opposite sides of the terminal 16, as shown in FIG. 2, in a position generally intermediate the component 17 and the portion of the terminal 16 being subjected to the heat source. It is contemplated, however, that the component 17 could be coupled to the terminal 16 adjacent the lower end portion of the terminal 16 where the component 17 is capable of at least withstanding the melting points of the solderable materials being used. In that case, the heat source may be applied to the terminal 16 generally intermediate the location of the jaws 14a and 14b and the component 17.

Where the terminal 16 does not have a layer of solder predisposed on the lower surface thereof, the soldering mechanism of the present invention is ideally suited to first apply a solder layer to the terminal 16 and then secure the terminal 16 to the glass plate 24. For example, after a terminal 16 has been secured between jaws 14a and 14b, the jaws 14a and 14b could be used to position the terminal 16 closely adjacent a solder-wire feeder apparatus, or other conventional device. Sufficient heat is then applied to the terminal 16, using the intermittent micro flame soldering tool 20, to melt the solder-wire. The surface tension of the molten solder will allow it to adhere to the lower surface of terminal 16. The molten solder rapidly cools (as described previously), forming a solid solder layer 28 along the lower surface of the terminal 16. The jaws 14a and 14b then position the terminal 16 closely adjacent the glass plate 24 and the soldering cycle described previously is commenced.

The terminal 16 can also be soldered to the glass plate 24 when the glass is preheated to a temperature just below the temperature that the solder layer 28 becomes molten. This minimizes the effect of the difference in the rate of expansion between the terminal 16 and the glass plate 24, thereby reducing the stress that the terminal 16 will exert on the surface of the glass plate 24 once the solder layer 28 is fully cooled. This effectively improves the mechanical strength of the connection between terminal 16 and glass plate 24.

In the drawings and in the specification, there has been set forth preferred embodiments of the invention and although specific items are employed, these are used in a generic and descriptive sense only and not for purposes of limitation. Changes in the form and proportion of parts, as well as a substitution of equivalents, are contemplated and circumstances may suggest or render expedient without departing from the spirit or scope of the invention as further defined in the following claims.

Thus it can be seen that the invention accomplishes at least all of its stated objectives.

I claim:

1. A system for soldering a workpiece, having upper and lower end portions and a layer of solderable material disposed on said lower end portion, to a point of use on an underlying substrate, comprising:

a workpiece gripper, having gripping jaws that are adapted to secure the workpiece thereby and position the workpiece closely adjacent the point of use on the underlying substrate;

a heat source operatively coupled with said workpiece gripper for heating the workpiece, when the workpiece has been positioned closely adjacent the point of use on the underlying substrate, to a temperature that is at least sufficient to melt the layer of solderable material; and said gripping jaws being comprised of a sufficient mass of heat-conductive material to remove excess heat from the workpiece and molten layer of solderable material so that heat disbursal to the underlying substrate is insufficient to damage the underlying substrate.

2. The system of claim 1 wherein said workpiece and said substrate have dissimilar material compositions.

3. The system of claim 1 further comprising a cooling device operatively coupled with said workpiece gripper for forcing compressed gas into the system and directing a jet of gas to the workpiece for cooling the workpiece.

4. The system of claim 1 wherein said intense heat source is an intermittent micro flame.

5. The system of claim 4 further comprising an ignition source, closely adjacent said intermittent micro flame.

6. A method for soldering a workpiece, having upper and lower end portions and a layer of solderable material disposed on said lower end portion, to a point of use on an underlying substrate, comprising the steps of:

providing at least a workpiece gripper, having gripping jaws comprised of a heat-conductive material, that is adapted to selectively locate said workpiece to a point of use;

providing a heat source that is operatively coupled with said workpiece gripper;

securing the workpiece with said gripping jaws;

actuating said workpiece gripper to position said workpiece closely adjacent the point of use on the underlying substrate;

heating the workpiece with sufficient heat from said heat source to overcome the heat-conductive capability of said gripping jaws and melt the layer of solderable material;

terminating the application of heat to the terminal; and conducting excess heat away from the workpiece and molten layer of solderable material, through said gripping jaws so that the workpiece and molten layer of solderable material are rapidly cooled and the disbursal of heat through the workpiece and layer of solder to the underlying substrate is insufficient to damage the underlying substrate.

7. The method of claim 6 wherein said workpiece and said substrate have dissimilar material compositions.

8. The method of claim 6 further comprising the steps of providing said workpiece with a component that is operatively electrically coupled to said workpiece and conducting excess heat away from said workpiece through said gripping jaws so that the disbursal of heat through said workpiece to said component is insufficient to damage the component.

9. A system for soldering a workpiece, having upper and lower end portions, to a point of use on an underlying substrate, comprising:

a dispensing apparatus having solderable material disposed therein;

a workpiece gripper, having gripping jaws that are adapted to secure the workpiece thereby and selectively position the workpiece closely adjacent said dispensing apparatus and the substrate; and a heat source operatively coupled to said workpiece gripper and said dispensing apparatus for heating the workpiece, when the workpiece has been positioned closely adjacent said dispensing apparatus and closely adjacent the substrate, to a temperature that is at least sufficient to melt said solderable material;

said gripping jaws being comprised of a sufficient mass of heat-conductive material to remove excess heat from the workpiece and molten solderable material so that any heat disbursal to the underlying substrate is insufficient to damage the underlying substrate.

10. A method for soldering a workpiece, having upper and lower end portions, to an underlying substrate, the workpiece and substrate having dissimilar material compositions, comprising the steps of:

providing a dispensing apparatus with solderable material disposed therein;
providing a workpiece gripper having gripping jaws, comprised of a heat-conductive material, adjacent said solder dispensing apparatus;
providing a heat source adjacent said workpiece gripper;

securing the workpiece with said gripping jaws;

positioning said workpiece closely adjacent said dispensing apparatus;

heating the workpiece with sufficient heat from said heat source to overcome the heat-conductive capability of said gripping jaws, dispensing the solderable material from said dispensing apparatus closely adjacent the workpiece so that the solderable material melts and adheres to the lower end portion of the workpiece;

terminating the application of heat to the workpiece;

conducting excess heat away from the workpiece and molten solderable material, through the gripping jaws, so that the workpiece and molten solderable material are rapidly cooled, forming a layer of solderable material on the lower end portion of the workpiece;

positioning the workpiece closely adjacent the point of use on the substrate;

heating the workpiece with sufficient heat from said heat source to overcome the heat-conductive capability of said gripping jaws and melt the layer of solderable material;

terminating the application of heat to the workpiece; and conducting excess heat away from the workpiece and molten layer of solderable material, through the gripping jaws, so that the workpiece and molten solderable material are rapidly cooled and heat disbursal through the workpiece and layer of solderable material to the underlying substrate is insufficient to damage the underlying substrate.

11. The method of claim 10 further comprising the steps of providing said workpiece with a component that is operatively coupled to said workpiece and conducting excess heat away from said workpiece through said gripping jaws so that the disbursal of heat through said workpiece to said component is insufficient to damage the component.

12. A system for soldering a workpiece, having upper and lower end portions and a layer of solderable material disposed on said lower end portion, to a point of use on an underlying substrate, comprising:

a workpiece gripper, having gripping jaws that are adapted to secure the workpiece thereby and position the workpiece closely adjacent the point of use on the underlying substrate; and an electrical resistance heat source for heating the workpiece, when the workpiece has been positioned closely adjacent the point of use on the underlying substrate, to a temperature that is at least sufficient to melt the layer of solderable material;

said gripping jaws being comprised of a sufficient mass of heat-conductive material to remove excess heat from the workpiece and molten layer of solderable material so that heat disbursal to the underlying substrate is insufficient to damage the underlying substrate.

13. A system for soldering a workpiece, having upper and lower end portions and a layer of solderable material disposed on said lower end portion, to a point of use on an underlying substrate, comprising:

a workpiece gripper, having gripping jaws that are adapted to secure the workpiece thereby and position the workpiece closely adjacent the point of use on the underlying substrate;

an intermittent microflame for heating the workpiece, when the workpiece has been positioned closely adjacent the point of use on the underlying substrate, to a temperature that is at least sufficient to melt the layer of solderable material; and an ignition source, positioned closely adjacent said intermittent microflame, that is comprised of an elongated hollow structure, whish is shaped to direct a jet of gas to the workpiece for cooling the workpiece;

said gripping jaws being comprised of a sufficient mass of heat-conductive material to remove excess heat from the workpiece and molten layer of solderable material so that heat disbursal to the underlying substrate is insufficient to damage the underlying substrate.

14. A system for soldering a workpiece, having upper and lower end portions a component operatively coupled to said workpiece, and a layer of solderable material disposed on the lower end portion of said workpiece, to a point of use on an underlying substrate, the system comprising:

a workpiece gripper, having gripping jaws that are adapted to secure the workpiece thereby and position the workpiece closely adjacent the point of use on the underlying substrate; and a heat source for heating the workpiece, when the workpiece has been positioned closely adjacent the point of use on the underlying substrate, to a temperature that is at least sufficient to melt the layer of solderable material;

said gripping jaws being comprised of a sufficient mass of heat-conductive material to remove excess heat from the workpiece and molten layer of solderable material so that heat disbursal to the underlying substrate and the component is insufficient to damage the underlying substrate or the component.

15. A method for soldering a workpiece, having upper and lower end portions and a layer of solderable material disposed on said lower end portion, to a point of use on an underlying substrate, comprising the steps of:

providing at least a workpiece gripper having gripping jaws comprised of a heat-conductive material;

providing a heat source adjacent said workpiece gripper;

providing a cooling device adjacent said workpiece gripper;

securing the workpiece with said gripping jaws;

positioning said workpiece closely adjacent the point of use on the underlying substrate;

heating the workpiece with sufficient heat from said heat source to overcome the heat-conductive capability of said gripping jaws and melt the layer of solderable material;

terminating the application of heat to the terminal; and conducting excess heat away from the workpiece and molten layer of solderable material, by directing a jet of gas to the workpiece from said cooling device and through conduction using said gripping jaws, so that the workpiece and molten layer of solderable material are rapidly cooled and the disbursal of heat through the workpiece and layer of solder to the underlying substrate is insufficient to damage the underlying substrate.

16. The method of claim 15 wherein said gas is comprised of air.

17. The method of claim 15 wherein said gas is comprised of an inert gas, so that oxidation of the workpiece, the layer of solder, and the substrate, is minimized.

18. The method of claim 17 wherein said inert gas is a shielding gas.

19. A method for soldering a workpiece, having upper and lower end portions, a component operatively electrically coupled to said workpiece and a layer of solderable material disposed on the said lower end portion of said workpiece, to a point of use on an underlying substrate, comprising the steps of:

providing at least a workpiece gripper having gripping jaws comprised of a heat-conductive material;

providing a heat source adjacent said workpiece gripper;

providing a cooling device adjacent said workpiece gripper;

securing the workpiece with said gripping jaws;

positioning said workpiece closely adjacent the point of use on the underlying substrate;

heating the workpiece with sufficient heat from said heat source to overcome the heat-conductive capability of said gripping jaws and melt the layer of solderable material;

terminating the application of heat to the terminal; and conducting excess heat away from the workpiece and molten layer of solderable material, by directing a jet of gas to the workpiece from said cooling device and through conduction using said gripping jaws, so that the workpiece and molten layer of solderable material are rapidly cooled and the disbursal of heat through the workpiece and layer of solder to the underlying substrate and the component is insufficient to damage the underlying substrate or the component.

20. A system for soldering a workpiece, having upper and lower end portions and a component operatively coupled to said workpiece, a component operatively coupled to said workpiece, and a layer of solderable material disposed on the lower end portion of said workpiece, to a point of use on an underlying substrate, the system comprising:

a workpiece gripper, having gripping jaws that are adapted to secure the workpiece thereby and position the workpiece closely adjacent the point of use on the underlying substrate; and a heat source for heating the workpiece, when the workpiece has been positioned closely adjacent the point of use on the underlying substrate, to a temperature that is at least sufficient to melt the layer of solderable material;

said gripping jaws being comprised of a sufficient mass of heat-conductive material to remove excess heat from the workpiece and molten layer of solderable material so that heat disbursal to the underlying substrate and the component is insufficient to damage the underlying substrate or the component.

* * * * *